June 30, 1931.  A. PARTIN  1,811,961

MOTOR SUSPENSION SPRING MEANS

Filed April 21, 1930

Inventor

Albert Partin

By *Clarence A. O'Brien*

Attorney

Patented June 30, 1931

1,811,961

UNITED STATES PATENT OFFICE

ALBERT PARTIN, OF PORTALES, NEW MEXICO

MOTOR SUSPENSION SPRING MEANS

Application filed April 21, 1930. Serial No. 446,035.

This invention relates to improved shock absorbing and motor suspending means in the nature of an auxiliary appliance for use in association with an existing strut on vehicle motors, for example of the model A Ford car type, and model AA Ford truck type.

At the present time, on these particular models of cars, there is a strut-like bracket which is fastened to the forward portion of the motor and associated with the frame in such a manner as to aid in supporting the motor. The purpose of my invention is to minimize vibration of the motor from the body of the car to give easier riding and more comforting conditions, and to promote longevity and to function further as a shock absorber for the motor.

In carrying the invention into effect, I have evolved and produced a duplex suspension spring made up of two leaves arranged in superposed relation and designed to fit comfortably in the existing frame structure and to co-operate with the leg portion of a shock bracket or attachment which constitutes a part of the regular equipment of the model A Ford cars and model AA Ford trucks.

Other features and advantages will become more readily apparent from the following description and drawings.

Figure 2:
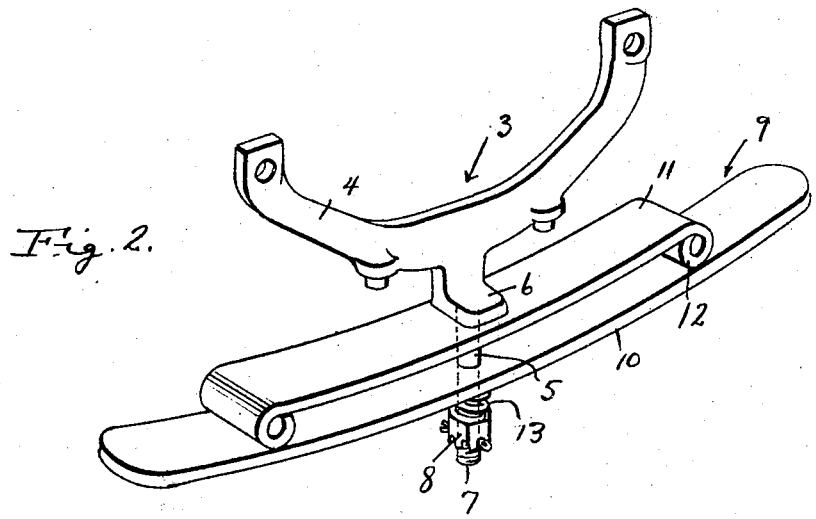
Figure 2 is a combination view showing the bracket and suspension means.

It will be observed from Figure 2 that the reference character 3 designates a conventional attaching bracket which constitutes a part of the regular equipment of the aforesaid type of car. This embodies an attaching yoke 4 having a stem portion 5 provided with an outstanding lip 6 constituting a shoulder. The stem portion is screw threaded as at 7 to accommodate a retaining nut 8. This bracket 3 as before stated, constitutes a part of the regular equipment.

The improvement is in the provision of the spring suspension device generally designated by the numeral 9. This comprises a longitudinally bowed lower leaf spring 10 and a similarly shaped upper leaf spring 11. The spring 11 is considerably shorter than the spring 10 and has its end portions curled as at 12 and resting on the intermediate end portion of the spring 10. Both of these springs are of appropriate texture and proportion to promote the desired resiliency and flexibility.

They are formed centrally with holes to accommodate the stem 5, the retaining nut 8, and the coil spring 13.

Figure 1:
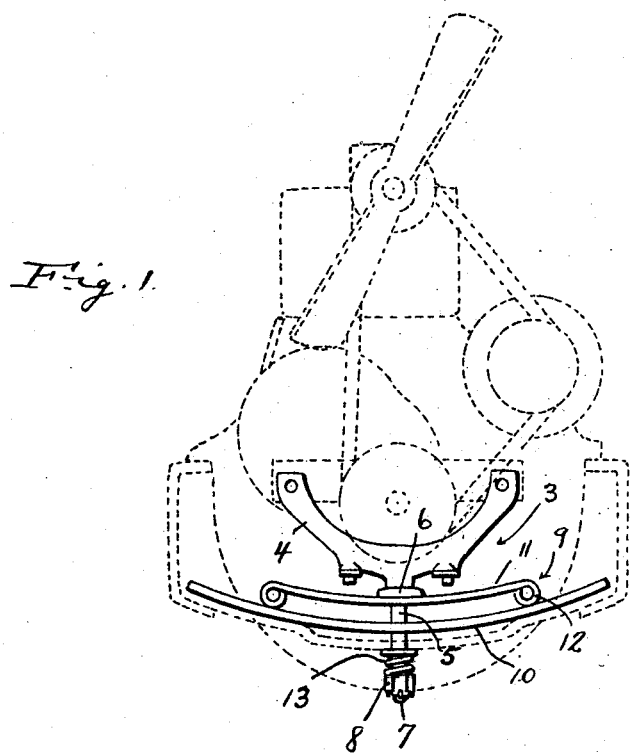
Figure 1 is a front elevational view showing the spring suspension means associated with the existing type of bracket and indicating the motor and frame in dotted lines.

The device 9 occupies the transverse position at the forward end of the motor in the frame as generally designated in Figure 1. Its co-operation with the bracket 4 is quite obvious since a considerable portion of the weight of the motor is brought to bear in the central part of the yoke and then transferred to the spring and finally transferred from the spring to the frame, thereby affording suitable shock absorbing and resilient spring suspension device for the attaching bracket, and the motor to which it is attached.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. As a new product of manufacture, a spring suspension device for use and association with a strut-like bracket of the class described comprising a relatively long curvate leaf spring constructed to rest on a motor vehicle frame, a relatively short upper leaf spring having its ends curled and resting on the end portions of said first named spring, both of said springs being formed with vertically alined leg receiving holes for the purpose specified.

2. As a new product of manufacture, a spring suspension device for use and association with a strut-like bracket of the class described comprising a relatively long curvate leaf spring constructed to rest on a motor vehicle frame, a relatively short upper leaf spring having its ends curled and resting on the end portions of said first named spring, both of said springs being formed with vertically alined leg receiving holes, an attaching bracket comprising a substantially U-shaped yoke having a centrally disposed depending screw-threaded leg and an outstanding lip constituting a stop, said stop resting against the intermediate upper face of said upper leaf spring, said screw-threaded leg extending downwardly through the aforesaid vertically alined hole, the lower end of the leg being screw-threaded, a nut carried by said screw-threaded end, and a coiled spring surrounding said screw-threaded end and interposed between the nut and lower leaf spring in the manner specified.

In testimony whereof I affix my signature.

ALBERT PARTIN.